July 5, 1927.
R. R. MORRILL
DRIER
Filed Nov. 29, 1922     2 Sheets-Sheet 1
1,634,882
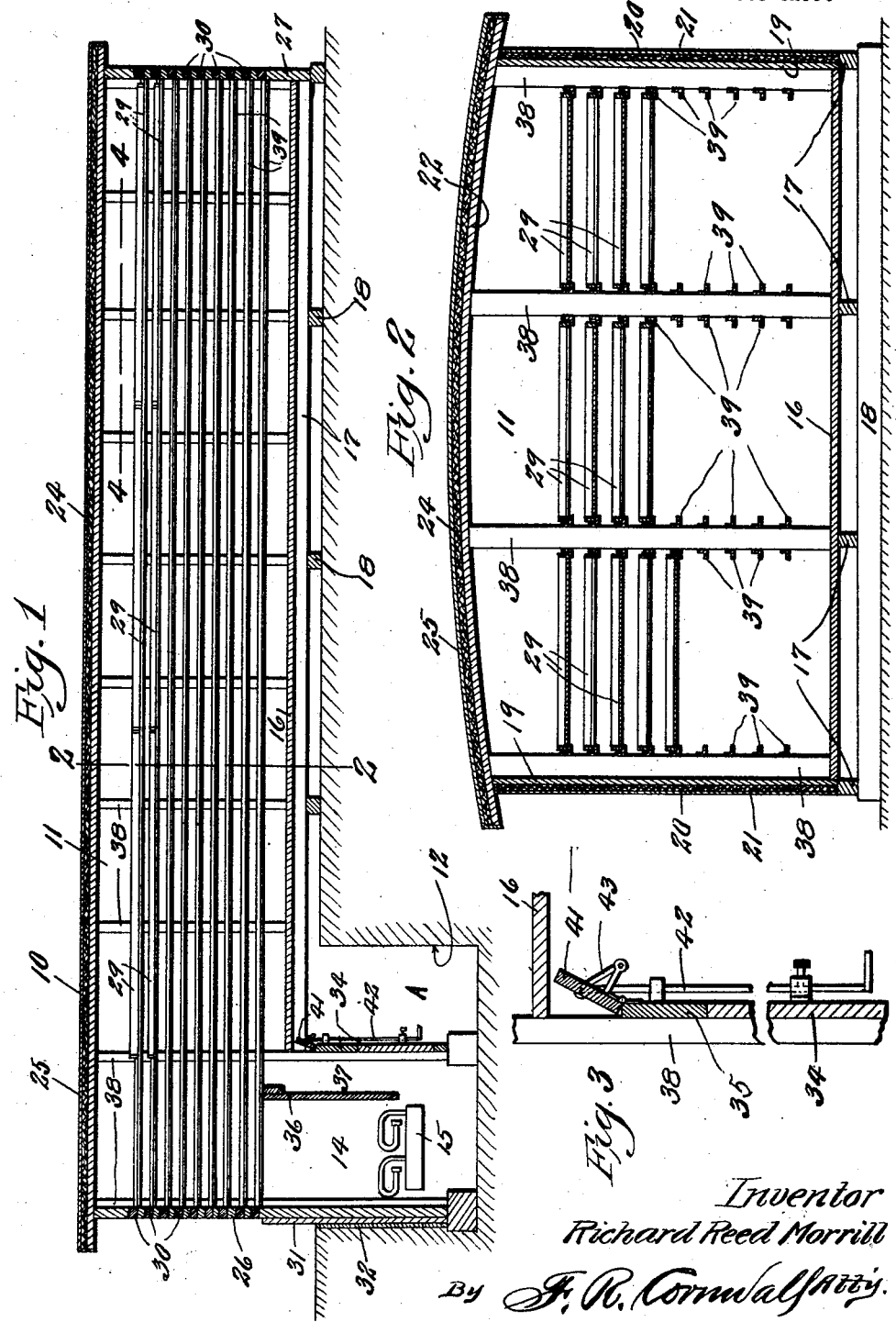
Inventor
Richard Reed Morrill
By F. R. Cornwall Atty.

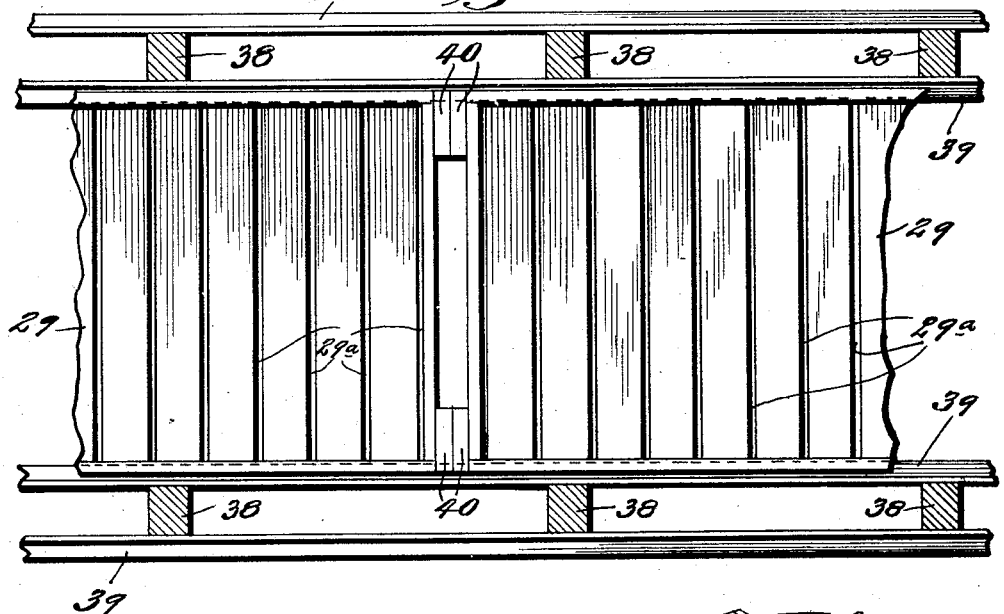
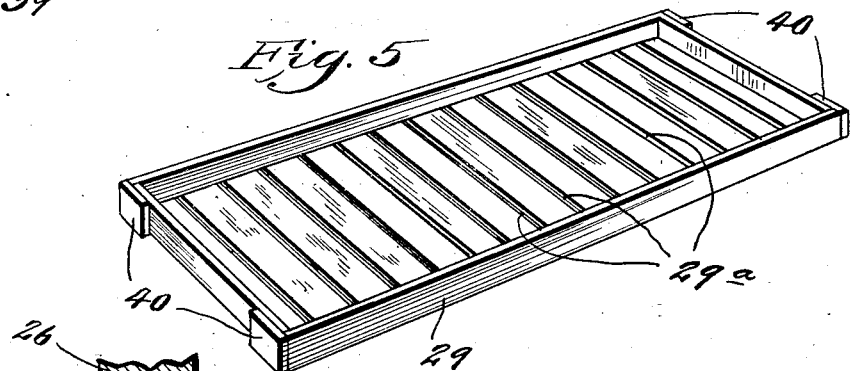
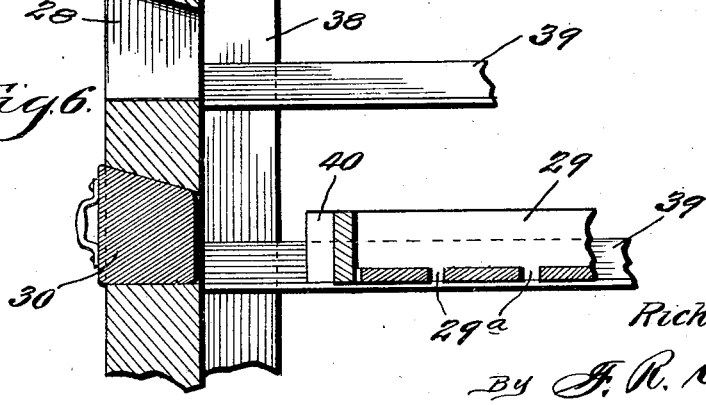

Patented July 5, 1927.

1,634,882

UNITED STATES PATENT OFFICE.

RICHARD REED MORRILL, OF PALO ALTO, CALIFORNIA, ASSIGNOR, BY MESNE ASSIGNMENTS, TO OLIVER OIL-GAS BURNER AND MACHINE COMPANY, OF ST. LOUIS, MISSOURI, A CORPORATION OF DELAWARE.

DRIER.

Application filed November 29, 1922. Serial No. 603,959.

This invention relates generally to driers and systems for heating the same and is particularly designed for drying or dehydrating fruit, vegetables, and the like, and the principal objects of the invention are to provide an improved system for heating driers and to provide a simple and efficient drier which is inexpensive to manufacture and economical to operate, and which can be easily installed.

Further objects of my invention are to provide a drier of the class described in which the heated air is effectively circulated around the material to be dried and the moisture laden air is drawn back to the heating chamber or discharged to the atmosphere and in which the drying material can be fed through the drying chamber in successive stages so that said material is subjected to gradually increasing temperatures.

Still further objects of the invention are to provide simple and durable drying trays which can be used in the field for gathering the fruit or other material and when filled can be transported to the drier and placed in the drying compartment, and to provide means for supporting the trays in spaced relation with each other and permit of circulation of the heated air around each tray.

In the drawings,—

Figure 1 is a vertical section taken longitudinally through the drier.

Figure 2 is a vertical cross-section taken on line 2—2 of Figure 1.

Figure 3 is a detail view of the inner wall of the heating compartment and showing means for regulating the discharge of the air therefrom.

Figure 4 is a horizontal detail view taken on line 4—4 of Figure 1.

Figure 5 is a perspective detail view of one of the trays.

Figure 6 is a detail view of one of the end walls of the housing, showing the manner in which the tray openings formed in said walls are closed.

Referring by numerals to the accompanying drawings, 10 designates a housing or building in which is located a drying chamber 11. One end of this building extends downwardly below the level of the ground into a pit 12 and forms a heating chamber 14 in which is located a suitable heating means 15 which may be of any desired construction, and is preferably of the oil-burner type.

Building 10 consists of a floor 16 which rests on joists 17, the latter being arranged in transverse members 18. The side walls 19 are provided with a layer of heat insulating material such as cellular boards 20 and are provided with a water-proof covering 21 which may be of roofing paper, tin, or any other suitable material. The roof 22 is similarly covered with a layer of heat insulating material 24 over which is placed a covering of waterproofing material 25. The end walls 26 and 27 of building 10 are provided with a plurality of openings 28 through which the drying trays 29 can be inserted into or discharged from the heating chamber and these openings are adapted to be closed by removable plugs 30 during the drying operations. End wall 26 extends downwardly into the pit 12 and forms the outer wall of heating chamber 14. This wall is covered with insulating material 31 and waterproofing cover 32.

The inner wall 34 of the heating chamber extends downwardly from the floor 16 and terminates a suitable distance from the floor of the pit so as to provide air space through which air may be admitted from the passageway A formed in said pit to the heating means 15. Wall 34 is provided with a door 35 through which access may be had from the passageway A to the heating chamber 14. A partition wall or baffle 36 is located in heating chamber 14 and is spaced a suitable distance inwardly from the inner wall 34 to provide a passageway 37. The upper end of baffle 36 extends upwardly a short distance beyond the floor 16 and the lower end of this wall terminates on the same plane with the heating means 15.

Projecting upwardly from the floor 16 at suitably spaced intervals are a plurality of uprights 38 which are arranged in a series of longitudinally disposed rows as shown in Figure 2. Extending longitudinally through the housing 10 and secured to uprights 38 are angle irons or supporting members 39 on the horizontal flanges of which are adapted to be slidably positioned trays 29. These angle irons are spaced from each other so that when trays are placed in position, each tray is spaced a sufficient distance from the adjacent trays. Each tray 29 is provided with an apertured bottom, as indicated at 29ª. The apertures may be formed either by spacing the slats forming the bottom of the tray or by providing the bottom of the tray with suitable perforations.

The ends of each tray are provided with abutment blocks or spacers 40 which, when the trays are in position in the drier, abut the spacers of the adjoining tray and space the contiguous end walls from each other.

Wall 34 is provided at its upper end with a hinged portion 41 which is designed to be adjusted in any suitable manner, such as a slide rod 42 and link 43, and regulate the opening through which the air may be discharged from the upper end of the passageway 37 to the atmosphere.

In using the drier, the trays containing the material to be dried are inserted in the drying chamber 11 through the openings formed in the front end wall 27. The length of the trays is such that when the proper number of trays are placed in a horizontal row on the respective supporting means, there is a space left open between the discharging or rear end wall 26 and the respective ends of the adjacent trays, so that the ends of the trays are preferably in vertical alignment with the inner wall 34. Thus the space in the drying chamber immediately above the heating chamber 14 is left unobstructed, permitting heated air to ascend and circulate between the various horizontal rows of the trays and around the latter. The heated air coming in contact with the fruit or other material placed on the trays will absorb the moisture therefrom and descend into the lower portion of the drying chamber. The ascent of the heated air creates suction in the heating chamber and causes the moist air in the lower portion of the building 10 to be drawn through the passageway 37 and therefrom back into the heating chamber.

The upper portion of chamber 11 between the top layer of trays 29 and roof 22 affords a chamber of proper dimensions for the equalization of temperatures of the gases. This space in the drying chamber immediately above the heating chamber 14 is left unobstructed, thus permitting the heated air to ascend freely into the upper portion of chamber 11 above the top layer of trays 29 where said heated air travels along roof 22 throughout its entire length and is forced downward by other hotter air coming up from heating chamber 14 thus forming a bank of heated air in the upper portion of chamber 11. This bank of heated air will vary in temperature along roof 22 but will equalize in temperature as it is forced downward until the bottom of said bank of air immediately above the top layer of trays 29 is of uniform temperature. The heated air of uniform temperature will come in contact with the fruit on the top layer of trays 29 and will give up its heat to the fruit, thereby driving out the moisture in said fruit. This moisture and air will mix and, due to its lower temperature, will descend to a lower level and be replaced by hotter and drier air from above. This process will continue downward through all of the trays 29 until the cooler moisture-laden air reaches the cool air chamber, the cool air chamber being the lower portion of chamber 11 which is between the floor 16 and bottom layer of trays 29. This cooler moisture-laden air is discharged in whole or part through discharge door 41 or recirculated in whole or part through passageway 37, the proportion to be discharged or recirculated depending upon the humidity desired.

When the material contained in the tray adjoining the wall 26 has been sufficiently dried, a tray containing fresh materials is inserted through the opening in wall 27, thereby displacing the trays arranged in this row so that the outer end of the first tray projects through the discharge end wall 26 and can be conveniently removed from the drier and while the two remaining trays are advanced one step through the drier, the intermediate tray occupying a position and adjacent to the discharge wall 26, the tray which formerly was adjoining the wall 27 now occupies an intermediate position and the new tray containing the fresh material occupying the front or loading end of the drier. In this manner the trays are fed in successive stages through the drier, the tray containing the fresh material being located in the loading end of the drier, and then being moved forwardly as new trays are introduced.

This drier can be operated by successive stages as explained above or it may be loaded wholly or in part from either end and also discharged wholly or in part from either end. This drier will operate successfully and dry the material uniformly at any given level, that is, any layer of trays, regardless of whether the drier is wholly loaded or only loaded in part. The fact that the heat is carried to the top of chamber 11 and then brought downward enables us to dry uniformly all fruit on any given layer of trays. This layer of trays is removed when the fruit is dry and the space left vacant and the dehydrator wholly unloaded by removing successively each layer of trays from the top downward; but if it is desired, trays containing fresh fruit may be put in as soon as the trays with the dried fruit are removed.

What I claim is:

1. A heating system for driers consisting of a drying chamber, material supporting means arranged therein and spaced from the top thereof to provide a mixing and tempering chamber in the upper end of said drying chamber, a hot air chamber communicating with one end of said drying chamber for introducing heated air into said mixing chamber, and exhaust connections communicating with the lower portion of said drying chamber for conveying from the lower portion of said drying chamber the chilled air.

2. A drier comprising a housing, the walls of which are insulated, said housing having a drying chamber and a heating chamber communicating therewith, heating means arranged in said heating chamber, a series of tray supporting members longitudinally disposed in said drying chamber and spaced from the top of said drying chamber to provide an air mixing and tempering space, a plurality of trays adapted to be removably arranged on said supporting members, passageways in said housing for exhausting the chilled air from said drying chamber.

3. In a drier, the combination with a housing having a drying chamber, of tray supporting tracks arranged therein in superimposed series, a plurality of trays adapted to be removably supported in said drying chamber by said supporting tracks, each tray being adapted to be moved progressively in said tracks through said drying chamber and having an apertured bottom wall to permit the circulation of air therethrough, and means carried by the ends of each tray for spacing the ends of the adjoining trays.

4. A drier comprising a drying compartment, a heating compartment arranged below one end of said drying chamber and communicating therewith, heating means arranged in the bottom of said heating compartment, a plurality of trays removably arranged in said drying compartment in spaced relation with each other and adapted to be moved in successive stages therethrough, and a chamber communicating with the lower portion of said drying compartment and opening into the lower portion of said heating compartment for recirculating the heated air by the self-induced draft.

5. A drier comprising a drying compartment, a heating compartment arranged below said drying compartment and having its upper end opening thereinto, heating means arranged in the bottom of said heating compartment, a plurality of trays removably arranged in said drying compartment in spaced relation with each other and adapted to be moved in successive stages therethrough, a baffle wall in said heating compartment extending upwardly above the floor level of the drying compartment and having its lower end terminating short of the bottom of said heating compartment and forming a passage for conveying the chilled air from said drying compartment to the lower portion of said heating compartment, and adjustable means for discharging a portion of the used air from said passage and admitting thereinto fresh air.

6. A drier comprising a drying compartment, a heating compartment arranged below one end of said drying compartment and communicating therewith, heating means arranged in said heating compartment below the floor level of said drying compartment, a plurality of trays removably arranged in said drying compartment in spaced relation with each other and adapted to be moved in successive stages therethrough, a return air compartment communicating at its upper end with the lower portion of said drying compartment and having its lower end opening into said heating compartment, and means in said return air compartment for regulating the discharge of the air from said drying chamber after its completion of travel therethrough.

7. A drier having a drying chamber and a heating chamber located below said drying chamber and in communication therewith, a series of horizontally disposed runways arranged in said drying chamber and adapted to receive suitable material containers, the uppermost runways being spaced a suitable distance from the top of said drying chamber to permit hot air to be banked and mixed therein before coming in contact with the material to be dried, and a baffle wall in said heating chamber having its upper end terminating above the level of the floor of said drying chamber and its lower end terminating short of the bottom of said heating chamber for conveying the chilled air from the lower portion of said drying chamber to the lower portion of said heating chamber, thereby inducing the circulation of air through said drying chamber by the thermal condition of the air.

8. A drier comprising a drying chamber and a heating chamber, the latter being located below and in communication with one end of the first chamber, longitudinally disposed tray supporting members arranged in superimposed series in said drying chamber, there being a space provided in the upper portion of said drying chamber above the uppermost series of said supporting members for maintaining a supply of hot air in said space to be mixed and tempered so as to be of substantially uniform temperature when coming in contact with the material to be dried, and a return air chamber arranged adjacent to said heating chamber and having its upper end communicating with the lower portion of said drying chamber and its lower end opening into said heating chamber and inducing circulation of air through said drier.

9. A drier comprising a drying chamber and a heating chamber, the latter being located below and in communication with one end of the first chamber, longitudinally disposed tray supporting members arranged in superimposed series in said drying chamber, there being a space provided in the upper portion of said drying chamber above the uppermost series of said supporting members for maintaining a supply of hot air in said space to be mixed and tempered so as to be of substantially uniform temperature when coming in contact with the material to be dried, a return air chamber arranged adjacent to said heating chamber and having its upper end communicating with the lower portion of said drying chamber and its lower end opening into said heating chamber and inducing circulation of air through said drier, and a closure member in the outer wall of said return air chamber for controlling the discharge of the return air from said chamber.

10. In a drier, the combination of a drying compartment, adapted to receive a series of superimposed spaced layers of material to be dried, there being an air space provided in said compartment above the uppermost layer of material for maintaining a bank of hot air therein whereby said hot air is mixed and tempered to uniform temperature throughout said drying compartment before descending through the layers of material, a heating compartment arranged below said drying compartment and communicating with one end thereof, a partition wall arranged in said heating compartment and providing a return air compartment, the upper end of which communicates with the lower portion of said drying compartment and its lower end opens into said heating compartment, thereby conveying the chilled air from the lower portion of said drying compartment to the lower portion of said heating compartment.

11. In a drier, the combination of a drying compartment having intake and discharge openings formed in its respective end walls, tracks horizontally arranged in said drying compartment, trays slidably supported on said tracks and adapted to be moved progressively through said compartment by inserting fresh trays thereinto through the intake openings thereby displacing and discharging a tray adjacent to the respective discharge opening, and a heating compartment having communication with the upper and lower portions of said drying compartment for circulating hot air therethrough by virtue of the self-induced draft created by the arrangement of said compartments.

12. In a drier, the combination with a drying compartment adapted to have hot air circulated therethrough, tray supporting members disposed in said compartment, trays supported by said members, and a heating compartment arranged below the level of said drying compartment and having its upper and lower portions communicating with the respective portions of said drying chamber, the uppermost tray being spaced a suitable distance from the top of said drying compartment to provide a distributing passage above said trays for receiving and mixing the hot air before it is brought into contact with the material contained in said trays.

13. In a drier, a material drying compartment, a heating compartment located below said drying compartment, and a drying fluid passage extending into said drying compartment from said heating compartment, said drying fluid passage being of restricted cross sectional area and said drying compartment being of relatively large cross sectional area and provided with sufficient space between its top and the material to be dried to permit all of the drying fluid to be distributed over the horizontal surface of said material before said fluid is caused to descend in said compartment.

14. In a drier, a horizontally disposed drying compartment adapted to receive material to be dried, a fluid heating compartment arranged below and to one end of said drying compartment, a drying fluid supply passage extending upwardly and at right angles to said drying compartment and communicating therewith, said supply passage being of smaller cross sectional area relative to said drying compartment, thereby permitting the distribution of the drying fluid in horizontal plane before said fluid is caused to descend by the thermal conditions prevailing in said compartment, and a fluid passage leading from the lower portion of said drying compartment for conveying away said drying fluid.

In testimony whereof I hereunto affix my signature this first day of November, 1922.

RICHARD REED MORRILL.